(12) United States Patent
Nakajima

(10) Patent No.: US 8,627,027 B2
(45) Date of Patent: Jan. 7, 2014

(54) DATA PROCESSING APPARATUS, ACCESS CONTROL METHOD, AND STORAGE MEDIUM

(75) Inventor: Satoru Nakajima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 228 days.

(21) Appl. No.: 13/300,283

(22) Filed: Nov. 18, 2011

(65) Prior Publication Data

US 2012/0131295 A1 May 24, 2012

(30) Foreign Application Priority Data

Nov. 22, 2010 (JP) ................................. 2010-260527

(51) Int. Cl.
*G06F 13/00* (2006.01)

(52) U.S. Cl.
USPC .......................................................... 711/162

(58) Field of Classification Search
None
See application file for complete search history.

(56) References Cited

U.S. PATENT DOCUMENTS

| | | | |
|---|---|---|---|
| 6,704,754 | B1 | 3/2004 | Kobayashi et al. |
| 8,000,755 | B2 * | 8/2011 | Anzai et al. ................... 455/573 |
| 2006/0224850 | A1 | 10/2006 | Yamamoto et al. |
| 2009/0240877 | A1 | 9/2009 | Taniyama |

FOREIGN PATENT DOCUMENTS

| | | |
|---|---|---|
| GB | 2436629 A | 10/2007 |
| JP | 06-028298 A | 2/1994 |
| JP | 2000-353054 A | 12/2000 |
| JP | 2001-325130 A | 11/2001 |
| JP | 2004-164362 A | 6/2004 |
| JP | 2005-510809 A | 4/2005 |
| JP | 2006-134021 A | 5/2006 |
| JP | 2007-110700 A | 4/2007 |

OTHER PUBLICATIONS

"IBM. AIX 5L version 5.3 A guidance for controlling a system: Operating system and apparatuses"; Inst De Tehnica Agricola Mecagro; Oct. 31, 2012.
SX/A Command User Manual vol. 1;Nov. 30, 1995.

* cited by examiner

*Primary Examiner* — Duc Doan
(74) *Attorney, Agent, or Firm* — Canon USA Inc. IP Division

(57) ABSTRACT

When an accessible state of an external memory unit is instructed to be canceled and data is not storing in the external memory unit, a data processing apparatus cancels the accessible state of the external memory unit if the external memory unit is not set as a backup destination, and does not cancel the accessible state of the external memory unit if the external memory unit is set as the backup destination.

11 Claims, 18 Drawing Sheets

FIG.3

| DEVICE FILE NAME | VENDOR ID | PRODUCT ID | SERIAL NUMBER | STATE | NAME | TOTAL CAPACITY (MB) | REMAINING CAPACITY (MB) |
|---|---|---|---|---|---|---|---|
| /dev/sdb1 | 0x1111 | 0x2222 | 123456 | CONNECT | MEMORY MEDIUM | 980 | 283.6 |
| ... | | | | | | | |

STORAGE DESTINATION OF BACKUP DATA: [USB HDD ▼] — 601

SETTING OF USB HDD — 602
PATH TO FOLDER (DOUBLE-BYTE INPUT IS PERMITTED): [          ]

SETTING OF SMB SERVER — 603
HOST IP ADDRESS: [          ]
USER NAME: [          ]
PASSWORD: [          ]
CONFIRMATION INPUT: [          ]
PATH TO FOLDER (DOUBLE-BYTE INPUT IS PERMITTED): [          ]

☐ ENCRYPTION OF BACKUP DATA — 604
PASSWORD: [     ] (AT LEAST 7 TO 48 CHARACTERS)
CONFIRMATION INPUT: [     ] (AT LEAST 7 TO 48 CHARACTERS)

[OK] [CANCEL] — 605

FIG.12

|  | | OK | CANCEL |

SETTING OF ALL BACKUP

1201 — ☐ ALL BACKUP
1202 — ◉ EVERY DAY  [ ] : [ ]  EVERY DAY

1203 — ○ DAY OF WEEK [ ] : [ ] SUNDAY
[ ] : [ ] MONDAY
[ ] : [ ] TUESDAY
[ ] : [ ] WEDNESDAY
[ ] : [ ] THURSDAY
[ ] : [ ] FRIDAY
[ ] : [ ] SATURDAY

SETTING OF DIFFERENCE BACKUP

1204 — ☐ DIFFERENCE BACKUP
1205 — ◉ EVERY DAY  [ ] : [ ]  EVERY DAY

1206 — ○ DAY OF WEEK [ ] : [ ] SUNDAY
[ ] : [ ] MONDAY
[ ] : [ ] TUESDAY
[ ] : [ ] WEDNESDAY
[ ] : [ ] THURSDAY
[ ] : [ ] FRIDAY
[ ] : [ ] SATURDAY

1207

FIG.14
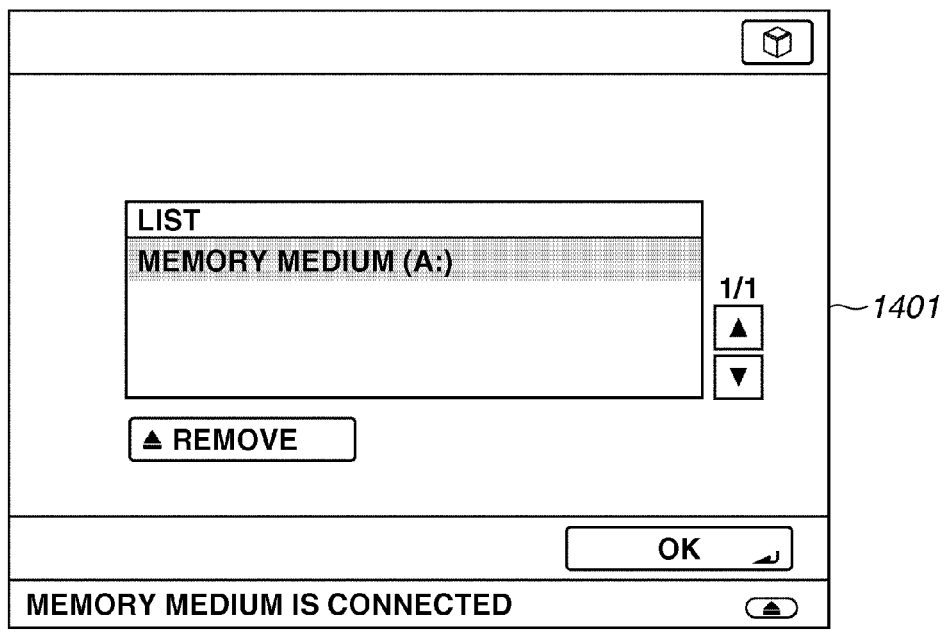
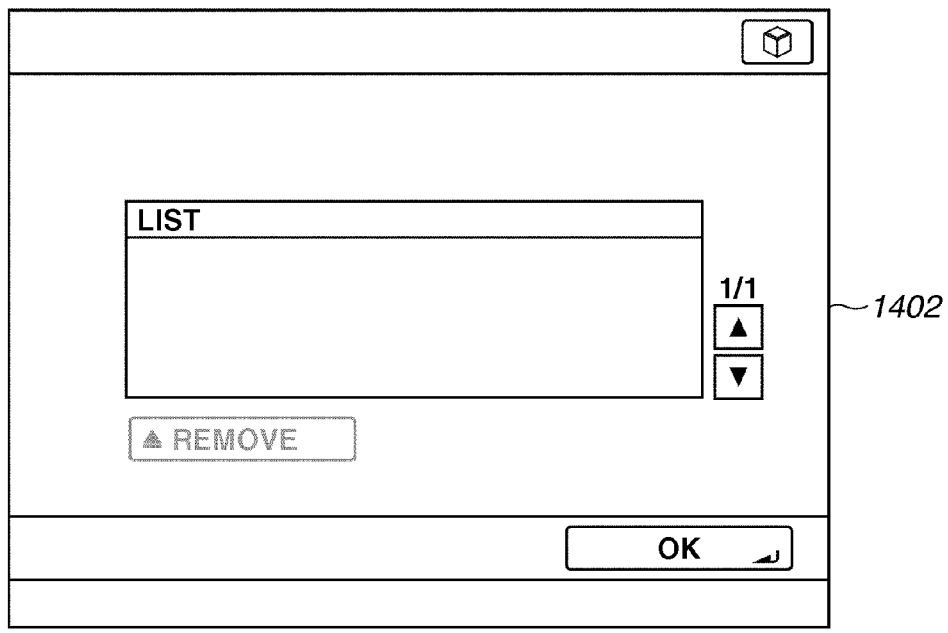

FIG.17

| STORAGE DESTINATION OF BACKUP DATA: | DO NOT SET ▽ | | OK | CANCEL |

SETTING OF USB HDD

PATH TO FOLDER (DOUBLE-BYTE INPUT IS PERMITTED): [          ]

SETTING OF SMB SERVER

HOST IP ADDRESS: [          ]

USER NAME: [          ]

PASSWORD: [          ]

CONFIRMATION INPUT: [          ]

PATH TO FOLDER (DOUBLE-BYTE INPUT IS PERMITTED): [          ]

☐ ENCRYPTION OF BACKUP DATA

PASSWORD: [          ] (AT LEAST 7 TO 48 CHARACTERS)

CONFIRMATION INPUT: [          ] (AT LEAST 7 TO 48 CHARACTERS)

DATA PROCESSING APPARATUS, ACCESS CONTROL METHOD, AND STORAGE MEDIUM

BACKGROUND OF THE INVENTION

1. Field of the Invention

The present invention relates to a data processing apparatus that backs up data in an external memory unit.

2. Description of the Related Art

There is a data processing apparatus that backs up data in an external memory unit. For example, to back up data in a universal-serial-bus (USB) storage device that is an example of an external memory unit, the data processing apparatus executes processing (e.g., mount processing) for setting the USB storage device operable to store the data in the USB storage device.

When a user removes the USB storage device from the data processing apparatus, the data processing apparatus executes processing (e.g., mount processing) for setting the USB storage device removable. Careless removable of the external memory unit during storage of the data in the external memory unit disables storage of the data in the external memory unit.

Japanese Patent Application Laid-Open No. 2007-110700 discusses a data processing apparatus that inhibits removal of an external memory unit while storing data in the external memory unit.

A conventional art has provided a data processing apparatus that inhibits removal of the external memory unit during access to the external memory unit. However, when the external memory unit is designated as a backup destination, a removable state of the external memory unit may not be desired even while there is no access to the external memory unit.

For example, When data is backed up in the external memory unit at designated time, if the external memory unit is removable at this time, the data cannot be stored in the external memory unit.

SUMMARY OF THE INVENTION

The present invention is directed to a data processing apparatus capable of reducing data backup failures in an external memory unit, and a method thereof.

According to an aspect of the present invention, a data processing apparatus configured to back up data in an external memory unit includes: an access control unit configured to set an accessible state of the external memory unit; a setting unit configured to set the external memory unit as a backup destination; and a backup unit configured to back up data in the external memory unit set in the accessible state and as the backup destination. Even when the accessible state of the external memory unit is instructed to be canceled and data is not stored in the external memory unit, the access control unit does not cancel the accessible state of the external memory unit if the external memory unit is set as the backup destination.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of a table for storing connection state information.

FIG. 5 illustrates an example of a screen of an operation unit 107 for displaying a connection state of the USB storage device.

FIG. 6 illustrates an example of a backup setting screen displayed on an external apparatus or the operation unit 107.

FIG. 12 illustrates an example of a setting screen for setting a backup schedule.

FIG. 14 illustrates an example of an operation screen for executing unmounting.

FIG. 17 illustrates an example of a backup setting screen displayed when backup setting is canceled.

DESCRIPTION OF THE EMBODIMENTS

Various exemplary embodiments, features, and aspects of the invention will be described in detail below with reference to the drawings.

Figure 1:
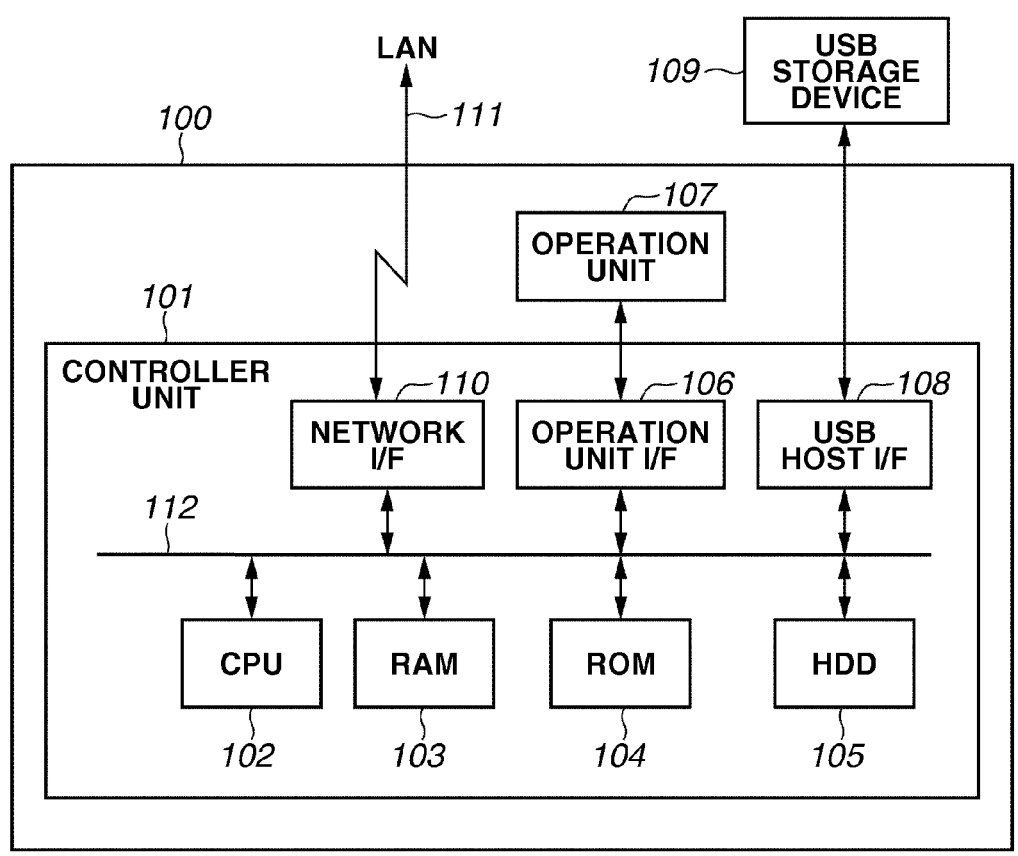
FIG. 1 is a block diagram illustrating a configuration of a data processing apparatus 100.

FIG. 1 is a block diagram illustrating a configuration of a data processing apparatus according to the present exemplary embodiment. The data processing apparatus 100 includes a controller unit 101 and an operation unit 107. The controller unit 101 includes a central processing unit (CPU) 102, a random access memory (RAM) 103, a read-only memory (ROM) 104, a hard disk drive (HDD) 105, an operation unit interface (I/F) 106, a USB host I/F 108, a network I/F 110, and a system bus 112.

The CPU 102 is a controller that controls the entire data processing apparatus, and is a center of the controller unit 101. The RAM 103 is a system work memory necessary for operating the CPU 102, and stores data processed by the CPU 102 or a program to be executed by the CPU 102.

The ROM 104 is a boot ROM to store a boot program. The HDD 105 stores a control program for controlling the data processing apparatus 100, or document data. The CPU 102 controls the data processing apparatus 100 by executing the boot program stored in the ROM 104 or the control program transferred from the HDD 105 to the RAM 103.

The operation I/F 106 is an interface unit that communicates with the operation unit 107. The operation I/F 106 outputs information to be displayed on the operation unit 107 to the operation unit 107, or receives information input from the operation unit 107. The operation unit 107 displays various pieces of information or receives instructions from a user. The operation unit 107 includes a display, a touch panel, or operation keys.

The USB host I/F 108 is an interface unit that communicates with a USB storage device 109. The USB host I/F 108 outputs the information input via the operation unit 107 or the document data stored in the HDD 105 to the USB storage device 109. The USB host I/F 108 receives data stored in the USB storage device 109 to transmit it to the CPU 102. The USB storage device 109 is an external memory unit that stores data, and is detachable from the USB host I/F 108. A plurality of USB devices including the USB storage device 109 can be connected to the USB host I/F 108.

The network I/F 110 is connected to a local area network (LAN) 111 to communicate with external apparatuses connected to the LAN 111. The LAN 111 can be replaced by another network that is not a LAN. The external apparatus may be a personal computer (PC), a data processing apparatus similar to the data processing apparatus 100, or a file server.

The system bus 112 is connected as a data transmission path to the abovementioned units.

The data processing apparatus 100 can also include an image input/output device such as a scanner or a printer. In such a case, the controller unit 101 is connected to the image input/output device to control it.

Figure 2:
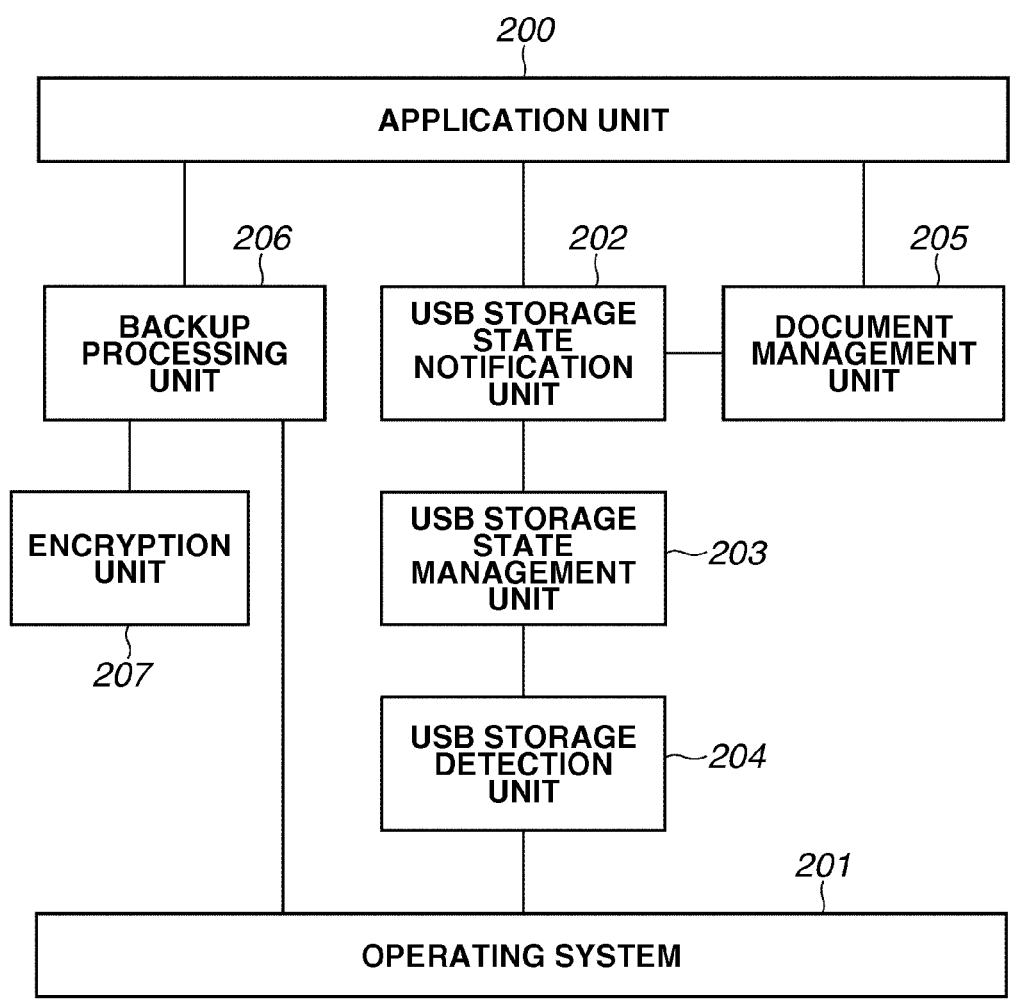
FIG. 2 is a block diagram illustrating a functional configuration of system software of the data processing apparatus 100.

FIG. 2 is a block diagram illustrating a functional configuration of system software of the data processing apparatus 100. The CPU 102 realizes each function by executing a program corresponding to the function.

An application unit 200 provides, to the user, a user interface for allowing the user to execute a reference instruction of a connection state of the USB storage device 109 or an unmounting instruction of the USB storage device 109 via the operation unit 107. The application unit 200 makes, according to an instruction from the user, an inquiry about the connection state of the USB storage device 109 to a USB storage state notification unit 202, and receives the connection state of the USB storage device 109.

The USB storage state notification unit 202 receives the connection state of the USB storage device 109 from a USB storage state management unit 203, and notifies the application unit 200 of the connection state.

The USB storage state management unit 203 manages the connection state of the USB storage device 109 detected by a USB storage detection unit 204.

The USB storage detection unit 204 makes an inquiry about the connection state of the USB storage device 109 to an operating system 201, receives the connection state of the USB storage device 109, and notifies the USB storage state management unit 203 of the connection state.

The USB storage detection unit 204 instructs, as a part of access control to the USB storage device, mounting or unmounting of the USB storage device to the operating system 201.

A document management unit 205 manages image data stored in the HDD 105 as image data. The document management unit 205 stores document data acquired from a scanner or document data acquired from the external apparatus via the LAN 111 in the HDD 105 via the operating system 201.

The document management unit 205 acquires document data requested from the operation unit 107 or the external apparatus connected to the LAN 111 from the HDD 105 via the operating system 201.

A backup processing unit 206 receives a backup instruction of the document data from the application unit 200 to create backup data of the document data stored in the HDD 105. The backup processing unit 206 stores the backup data in the USB storage device 109 via the operating system 201 or transmits the backup data to the external apparatus via the LAN 111.

The backup processing unit 206 acquires the backup data from the USB storage unit 109 via the operating system 201 or the backup data from the external apparatus via the LAN 111. The backup processing unit 206 restores the document data in the HDD 105 based on the acquired backup data.

An encryption unit 207 encrypts, according to an instruction from the backup processing unit 206, the backup data or decrypts the encrypted backup data.

According to the present exemplary embodiment, the backup data is stored in the USB storage device 109.

When the operating system 201 recognizes that the USB device has been connected to the USB host I/F 108, the operating system 201 reads a driver necessary for using the USB device.

The operating system 201 acquires device information from the USB device, and stores the device information as connection state information in the RAM 103. The operating system 201 then allocates a device file for accessing the USB device to the USB device.

Thus, the operating system 201 manages the entire USB device including the USB storage device. Hereinafter, the present exemplary embodiment is described by focusing on the USB storage device of the USB device.

FIG. 3 illustrates an example of a table for storing the connection state information. The operating system 201 manages the table on the RAM 103.

A device file name 301 is a name of a device file allocated to the USB storage device. A vendor ID 302 identifies a manufacturing vendor of the USB storage device. A product ID 303 identifies a product of the USB storage device.

A serial number 304 is a serial number of the USB storage device. A state 305 is a connection state of the USB storage device, indicating a connected state. A name 306 is a name given to the USB storage device. A total capacity 307 is a maximum data size storable in the USB storage device. A remaining capacity 308 is a data size storable thereafter in the USB storage device.

The USB storage state management unit 203 manages a table similar to that illustrated in FIG. 3 on the RAM 103, and updates the table based on the connection state information acquired from the operating system 201.

Figure 4:
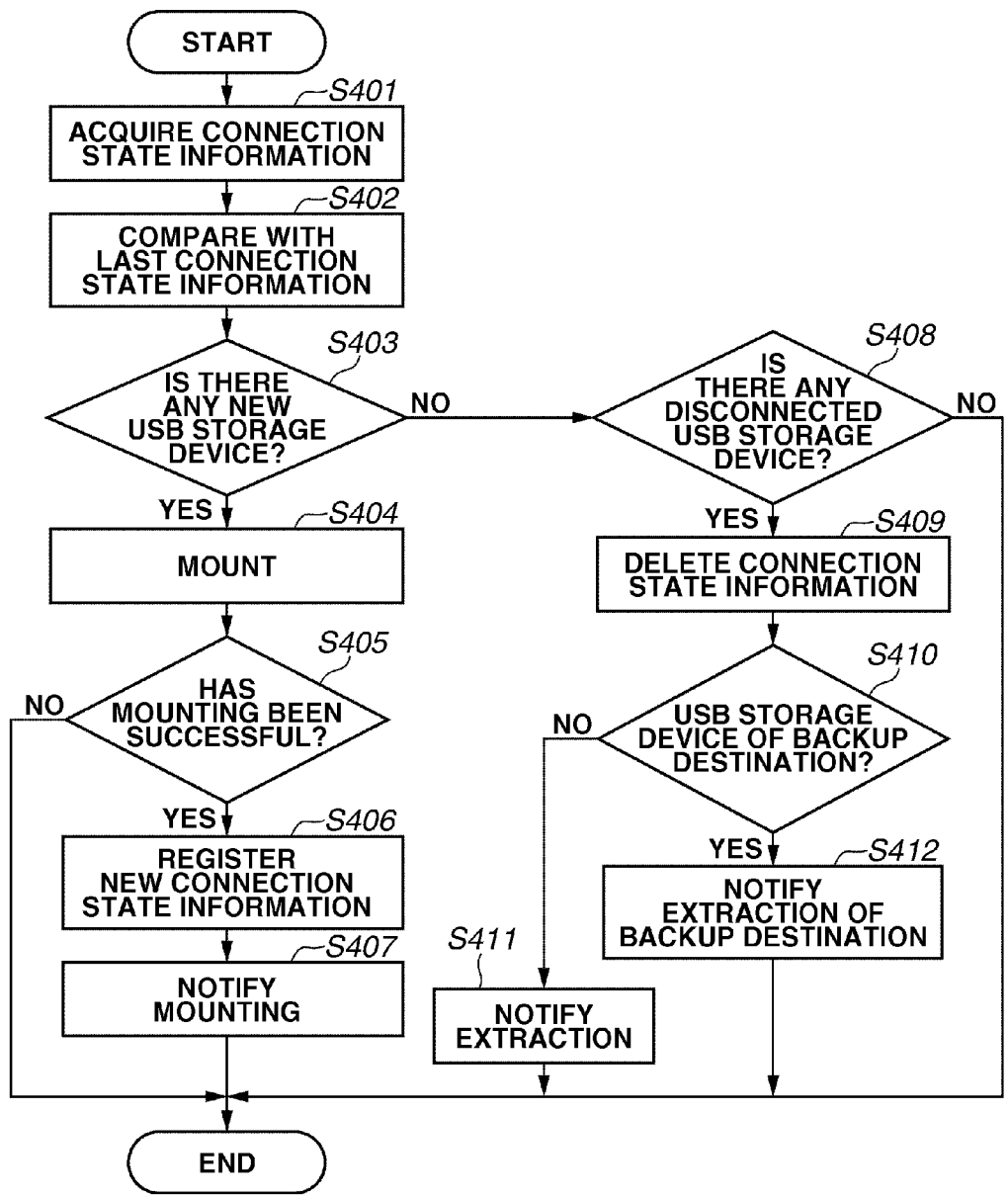
FIG. 4 is a flowchart illustrating connection processing of a USB storage device.

FIG. 4 is a flowchart illustrating connection processing of the USB storage device. The CPU 102 realizes the connection processing by executing a program.

In step S401, the USB storage detection unit 204 periodically acquires connection state information of the USB storage device from the operating system 201. In step S402, the USB storage detection unit 204 compares the acquired connection state information with connection state information managed by the USB storage state management unit 203.

In step S403, the USB storage detection unit 204 determines, based on a result of the comparison, whether there is, in the acquired connection state information, a USB storage device not present in the connection state information managed by the USB storage state management unit 203. In other words, the USB storage detection unit 204 determines whether a new USB storage device has been connected.

When there is a new USB storage device (YES in step S403), in step S404, the USB storage detection unit 204 instructs the operating system to mount the new USB storage device.

The operating system 201 treats the new USB storage device as a device file, and allocates the device file to an arbitrary layer of a file system. The layer to which the device file has been allocated becomes a mounting point. In layers below the mounting point, the file system of the USB storage device is expanded. This enables file access to the USB storage device.

Setting an accessible state to the USB storage device is referred to as mounting. Cancelling the accessible state to the USB storage device is referred to as unmounting. Thus, the operating system 201 executes mounting or unmounting of the USB storage device as a part of access control to the USB storage device.

In step S405, the USB storage detection unit 204 determines whether mounting has been performed successfully. When performed successfully (YES in step S405), in step S406, the USB storage detection unit 204 notifies the USB storage state management unit 203 thereof, and the USB storage state management unit 203 registers connection information of the new USB storage device in the table.

In step S407, the USB storage state management unit 203 notifies the application unit 200 of the mounting of the new USB storage device.

When there is no new USB storage device (NO in step S403), in step S408, the USB storage detection unit 204 determines whether there is any USB storage device present in the connection state information managed by the USB storage state management unit 203 but not in the acquired connection state information. In other words, the USB storage detection unit 204 determines whether there is any disconnected USB storage device.

When there is a disconnected USB storage device (YES in step S408), in step S409, the USB storage state management unit 203 deletes connection state information regarding this USB storage device from the table.

In step S410, the USB storage state management unit 203 determines whether the disconnected USB storage device has been set as a backup destination (storage destination of backup data). A method for setting the backup destination is described below.

When the USB storage device has not been set as a backup destination (NO in step S410), in step S411, the USB storage state management unit 203 notifies the application unit 200 of pulling-out of the USB storage device. The application unit 200 notifies the user of the pulling-out of the USB storage device, in other words, removal of the USB storage device as usual.

When the USB storage device has been set as a backup destination (YES in step S410), in step S412, the USB storage state management unit 203 notifies the application unit 200 of pulling-out of the USB storage device that is the backup destination. The application unit 200 notifies the user of the pulling-out of the USB storage device that is the backup destination, in other words, removal of the USB storage device that is the backup destination.

A method of notification to the user may display a message indicating the pulling-out of the USB storage device on the operation unit 107, or transmit a mail indicating the pulling-out of the USB storage device to a specific address.

Thus, even when the user removes the USB storage device without knowing that the USB storage device is the backup destination, the removal of the USB storage device that is the backup destination can be recognized.

Figure 5:
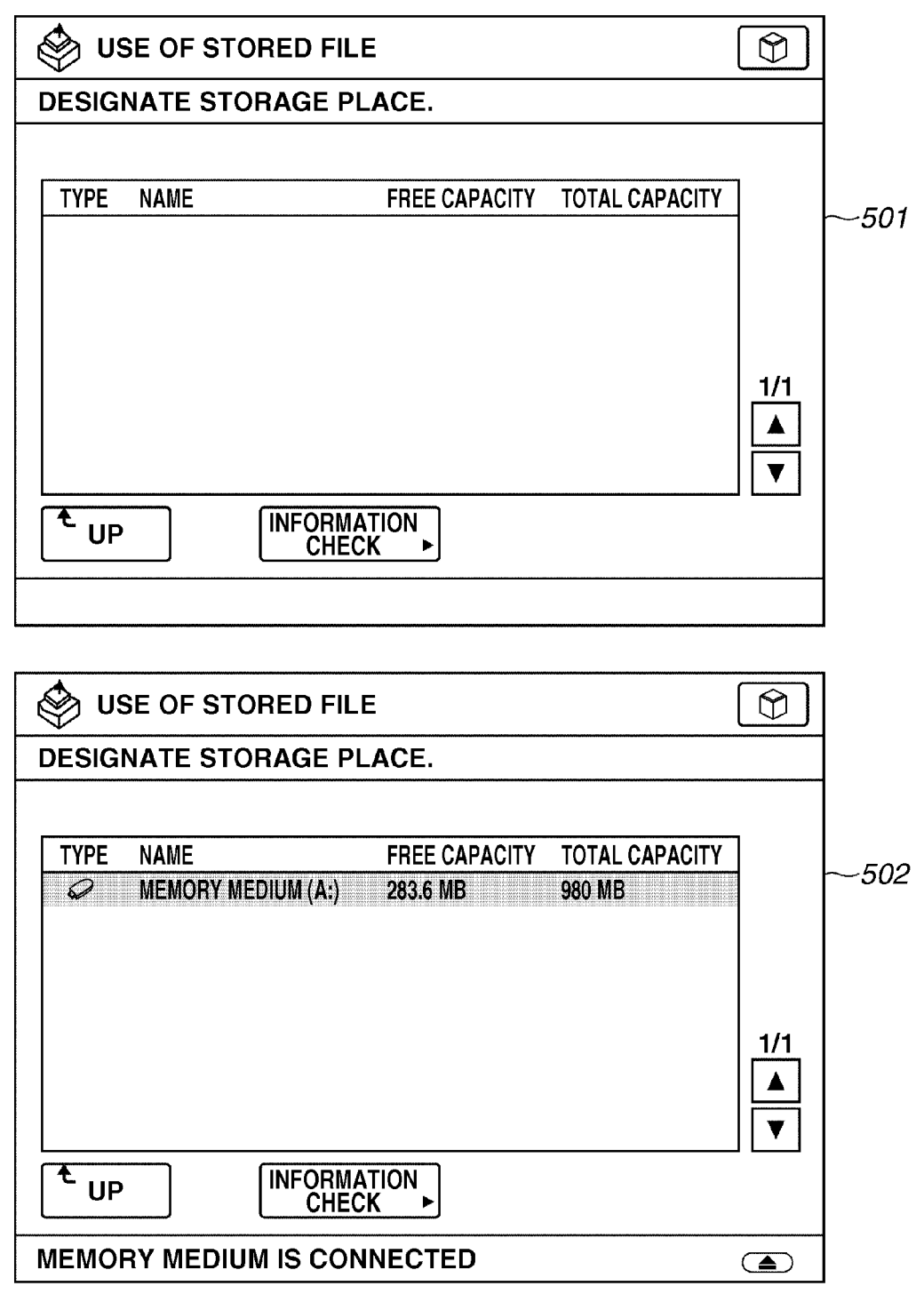

FIG. 5 illustrates an example of a screen of the operation unit 107 for displaying the connection state of the USB storage device. A screen 501 is displayed when no USB storage device is connected. A screen 502 is displayed when a new USB storage device is connected. A new USB storage named "memory medium" is added to a list.

Next, setting of the backup destination is described. The backup destination is set according to an instruction transmitted from the external apparatus via the LAN 111, or an instruction input via the operation unit 107.

FIG. 6 illustrates an example of a backup setting screen displayed on the external apparatus or the operation unit 107. A pull-down button 601 is for selecting a storage destination of backup data.

A user can select "USB HDD" or "SMB server" by using the pull-down button 601. The "USB HDD" is an example of a USB storage device. The "SMB server" transfers/receives data based on SMB protocol via the LAN 111.

An input area 602 is for inputting a path to a folder of the backup destination. When a user selects the "USB HDD", the user determines which folder of the USB HDD the backup data is stored in, and designates a path indicating the folder in the input area 602.

An input area 603 is for inputting information necessary for using the SMB server. When the user has selected the "SMB server", the user inputs information regarding the SMB server that is a storage destination of the backup data in the input area 603.

A "host IP address" is an IP address of the SMB server. A "user name" is a name of a user of the SMB server. A "password" is for using the SMB server, making a pair with the user name.

A "confirmation input" is an area for re-inputting the password to check it. A "path to folder" is a path to the folder of the backup destination. The user determines which folder of the SMB server the backup data is stored in, and designates the path indicating the folder as a "path to folder".

A check box 604 is for instructing whether to encrypt the backup data. To store the backup data by using encryption in the backup destination, the user checks the check box 604.

A "password" below the check box 604 is necessary for encrypting data. The user, who has checked the check box 604, designates a password necessary for encrypting the data as a "password". A "confirmation input" is an area for re-inputting the password to check it.

When the user presses an OK button 605 on a setting screen displayed on the external apparatus, data (referred to as backup setting data) set on the setting screen is transmitted from the external apparatus to the data processing apparatus 100 to be stored in the RAM 103.

When the user presses an OK button 605 on a setting screen displayed on the operation unit 107, data (referred to as backup setting data) set on the setting screen is stored in the RAM 103.

Figure 7:
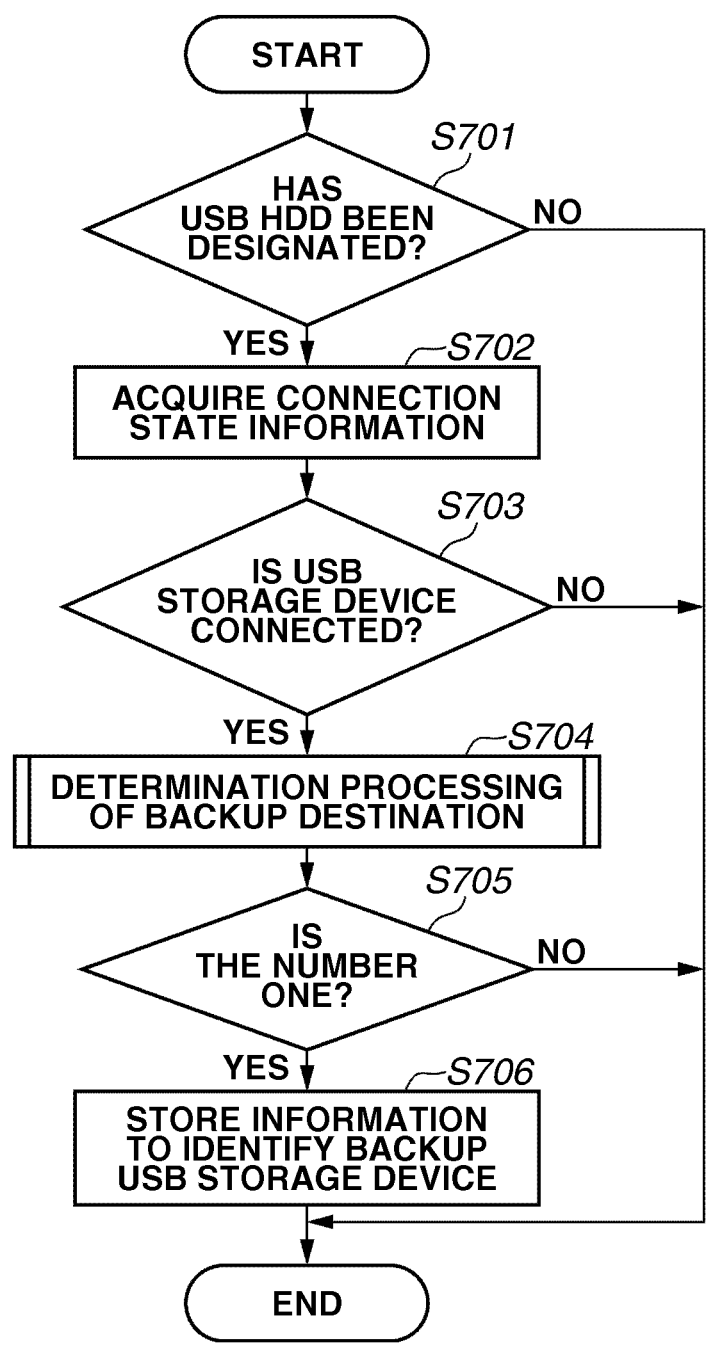
FIG. 7 is a flowchart illustrating setting of a backup destination.

FIG. 7 is a flowchart illustrating setting processing of a backup destination. The CPU 102 realizes the setting processing by executing a program. FIG. 7 illustrates only a case where the USB storage device is a backup destination.

In step S701, the application unit 200 determines whether the USB HDD has been designated as a backup destination based on data set on the setting screen. When it is determined that the USB HDD has not been designated as a backup destination (NO in step S701), the setting processing is ended.

When it is determined that the USB HDD has been designated as a backup destination (YES in step S701), in step S702, the application unit 200 acquires connection state information regarding the USB storage device connected to the data processing apparatus 100 from the USB storage state management unit 203.

In step S703, the application unit 200 determines whether the USB storage device has been connected to the data processing apparatus 100. When it is determined that the USB storage device has not been connected (NO in step S703), the setting processing is ended.

When it is determined that the USB storage device has been connected (YES in step S703), in step S704, the application unit 200 executes backup destination determination. The backup destination determination is described in detail below.

In step S705, after the backup destination determination, the application unit 200 determines whether the number of USB storage devices selected by the backup destination determination is one. When the number is zero or a plural number (NO in step S705), the setting processing is ended. When the number is one (YES in step S705), in step S706, the application unit 200 stores connection state information of the USB storage device as information (referred to as backup destination identification information) to identify a backup USB storage device in the RAM 103.

In step S410, the application unit 200 determines whether a disconnected USB storage device is the USB storage device indicated by the backup destination identification information.

Figure 8:
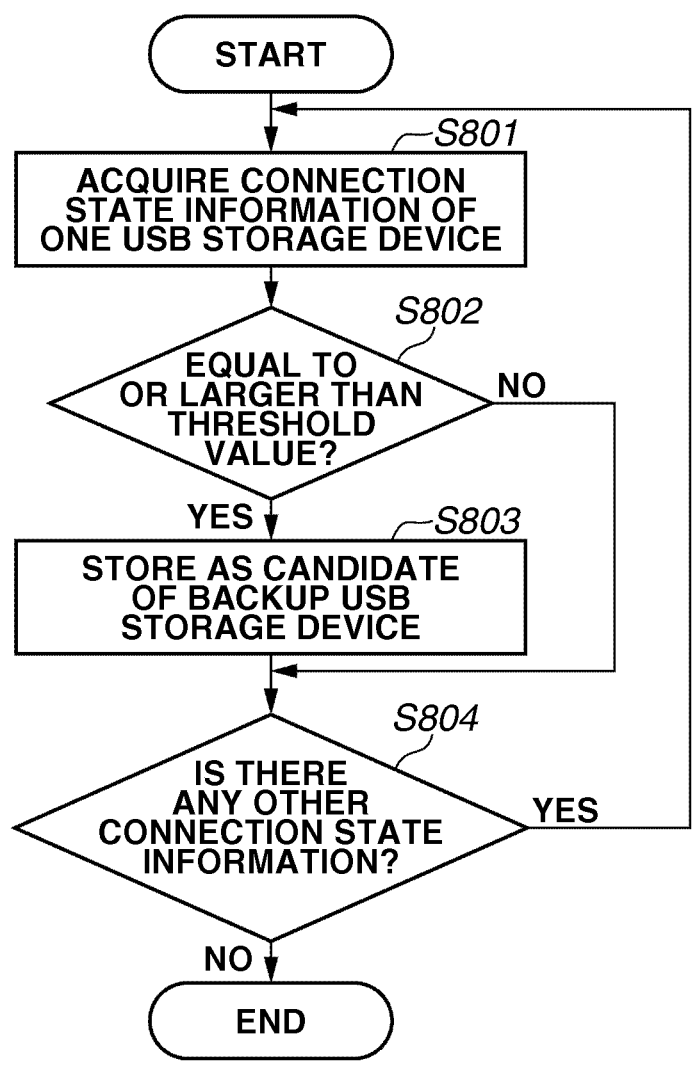
FIG. 8 is a flowchart illustrating backup destination determination.

FIG. 8 is a flowchart illustrating the backup destination determination processing performed in step S704. The CPU 102 realizes the backup destination determination by executing a program.

In step S801, the application unit 200 acquires, among pieces of connection state information of one or the plurality of USB storage devices acquired in step S702, connection state information of one USB storage device.

In step S802, the application unit 200 determines whether a total capacity indicated by the connection state information is equal to or larger than a threshold value. When it is smaller than the threshold value (NO in step S802), the processing proceeds to step S804. When it is equal to or larger than the threshold value (YES in step S802), in step S803, the application unit 200 stores the USB storage device as a candidate of a backup USB storage device.

In step S804, the application unit 200 determines whether there are other pieces of connection state information. When there is another piece of connection state information (YES in step S804), the processing returns to step S801. When there is no connection state information (NO in step S804), the backup destination determination is ended.

The threshold value can be arbitrarily determined as a selection criterion of a backup USB storage device. As an example, a partition size of the HDD 105 or a data size of data to be backed up can be set as a threshold value.

In step S802, the application unit 200 compares the total capacity of the USB storage device with the threshold value. However, the application unit 200 can compare an amount of free capacity of the USB storage device with the threshold value.

In the setting processing illustrated in FIG. 7, when there is a plurality of USB storage devices selected by the backup destination determination processing, no backup USB storage device is determined. This is to prevent selection of a USB storage device connected for a purpose other than backing-up as a backup USB storage device.

Next, data backing-up is described. The data is backed up according to an instruction transmitted from the external apparatus via the LAN 111 or an instruction input via the operation unit 107.

Figure 9:
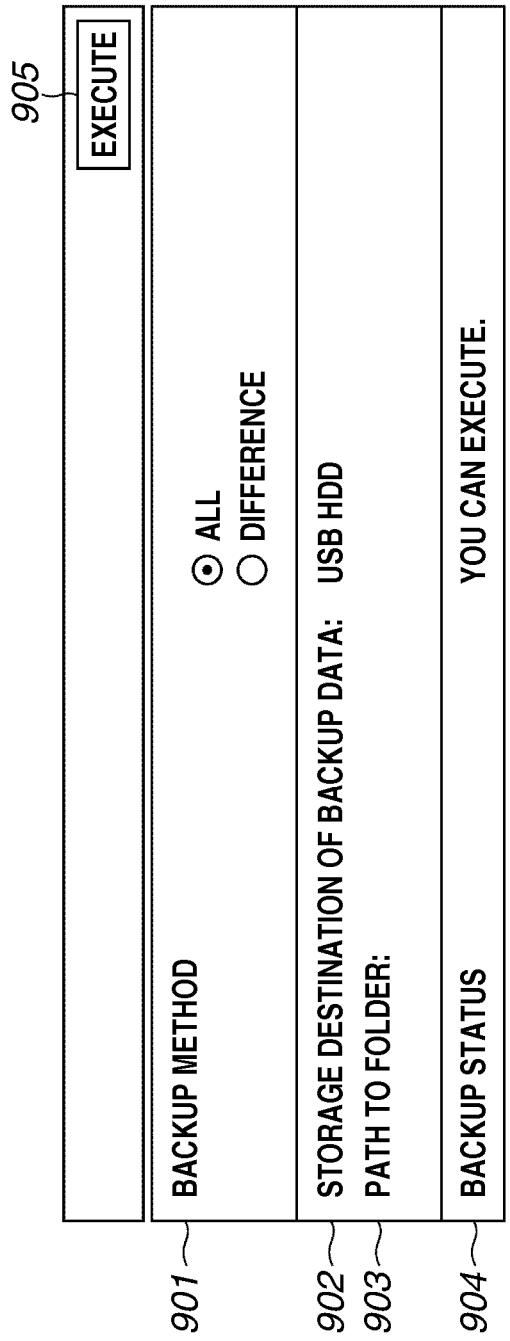
FIG. 9 illustrates an example of an operation screen for executing backing-up.

FIG. 9 illustrates an example of an operation screen for executing backing-up, which is displayed on the external apparatus or the operation unit 107.

An area 901 is for selecting backing-up of all document data stored in the data processing apparatus 100 or backing-up of a difference from that of a last time. An area 902 is for displaying a storage destination of backup data. An area 903 is for displaying a path to a folder of a backup destination. An area 904 is for displaying whether a backup executable state has been set. An execution button 905 is for instructing execution of backing-up.

Figure 10:
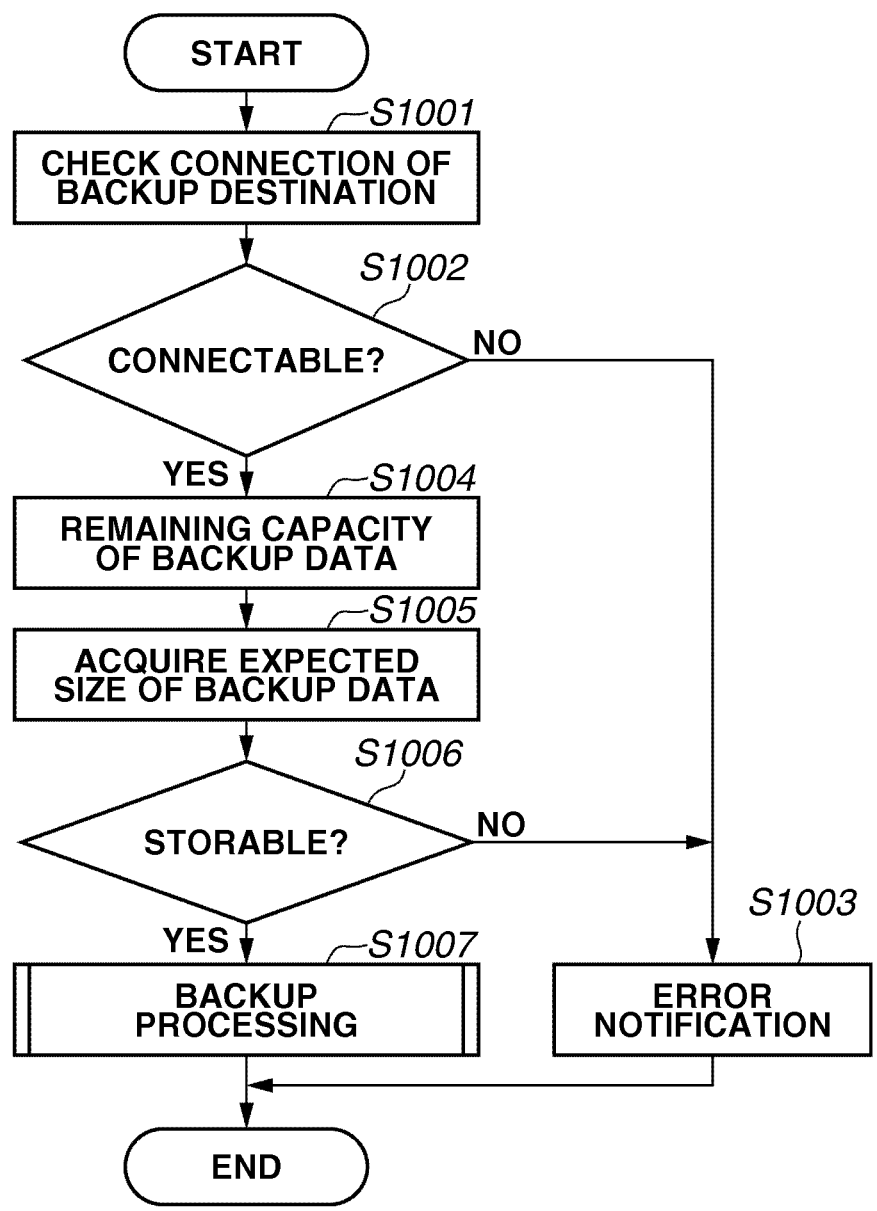
FIG. 10 is a flowchart illustrating backup start processing.

FIG. 10 is a flowchart illustrating backup start processing. The CPU 102 realizes the backup starting processing by executing a program.

In step S1001, when execution of backing-up is instructed, the application unit 200 checks connection of a backup destination according to the backup setting data and the backup destination identification information stored in the RAM 103.

In step S1002, the application unit 200 determines whether connection to the backup destination is permitted. When it is not permitted (NO in step S1002), in step S1003, the application unit 200 notifies an error to end the backup start processing.

When connection to the backup destination is permitted (YES in step S1002), in step S1004, the application unit 200 acquires a remaining amount of capacity of the backup destination. In step S1005, the application unit 200 calculates an expected size of backup data.

In step S1006, the application unit 200 compares the remaining amount of capacity acquired in step S1004 with the data size calculated in step S1005 to determine whether the backup data can be stored in the backup destination.

When the backup data can be stored (YES in step S1006), in step S1007, the application unit 200 causes the backup processing unit 206 to execute backup processing. The backup processing is described in detail below. When the backup data cannot be stored (NO in step S1006), in step S1003, the application unit 200 notifies an error.

Figure 11:
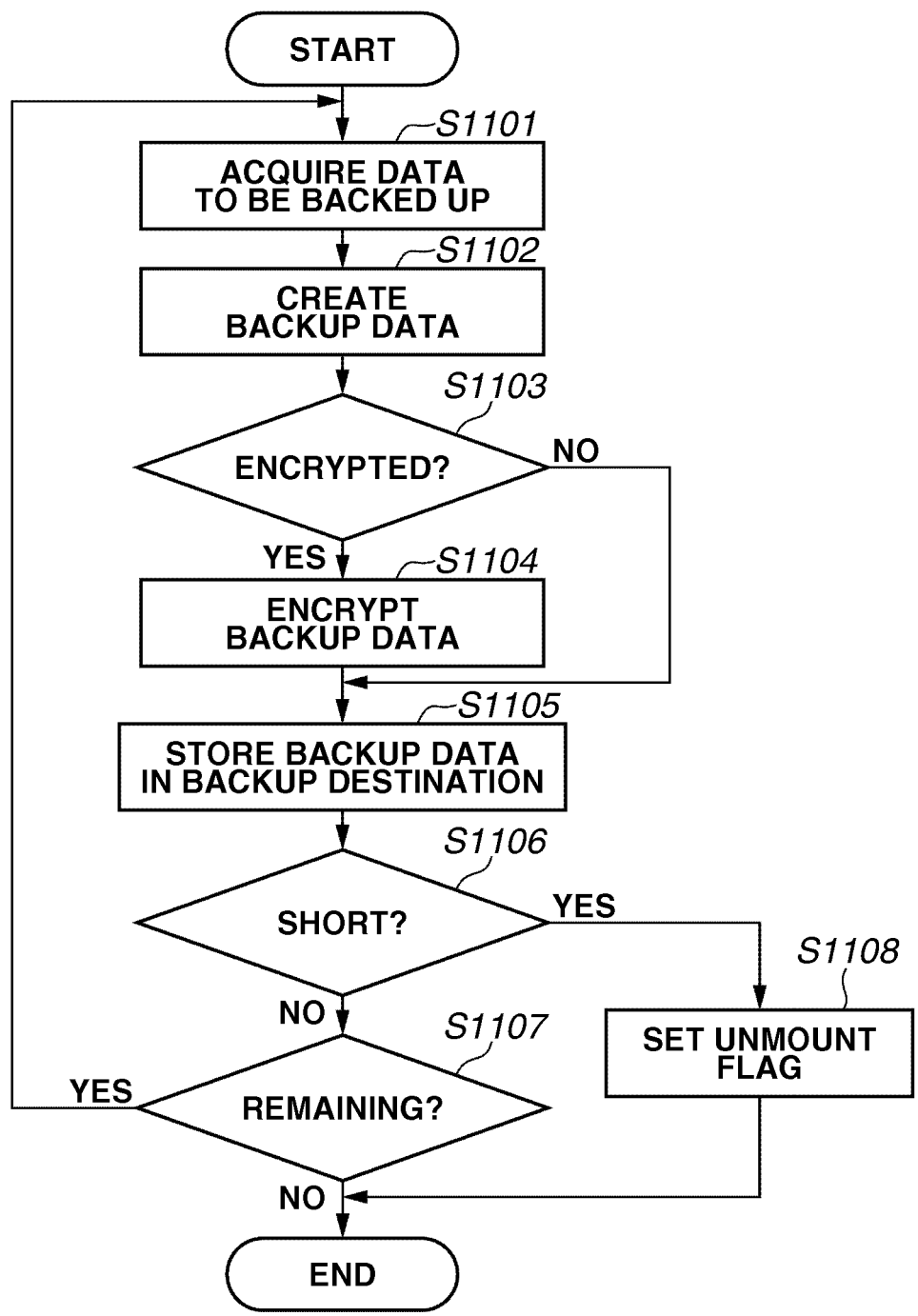
FIG. 11 is a flowchart illustrating back-up processing.

FIG. 11 is a flowchart illustrating the back-up processing performed in step S1007. The CPU 102 realizes the backup processing by executing a program.

In step S1101, the backup processing unit 206 acquires data to be backed up by a predetermined size. In step S1102, the backup processing unit 206 creates backup data.

In step S1103, the backup processing unit 206 determines whether encryption of the backup data has been instructed. When encryption of the backup data has been instructed (YES in step S1103), in step S1104, the encryption unit 207 encrypts the backup data.

In step S1105, the backup processing unit 206 stores the backup data in the backup destination. In step S1106, the backup processing unit 206 determines whether a remaining amount of capacity of the backup destination is short.

When it is not short (NO in step S1106), in step S1107, the backup processing unit 206 determines where there is still data to be backed up. When there is still data to be backed up (YES in step S1107), the processing proceeds to step S1101. When there is no data to be backed up (NO in step S1107), the backup processing is ended.

In step S1008, when the remaining amount of capacity of the backup destination becomes short during the backup processing, the backup processing unit 206 sets an unmount flag to end the backup processing.

The unmount flag indicates that only a specific user can unmount the backup USB storage device. In this case, only the specific user can unmount the backup USB storage device. For example, a system administrator is the specific user.

The backup processing is not necessarily executed by pressing the execution button 905. The backup processing may be executed according to a schedule. Next, the backup processing executed according to the schedule is described.

FIG. 12 illustrates an example of a setting screen for setting a backup schedule, which is displayed on the external apparatus or the operation unit 107.

A check box 1201 is for instructing whether to back up all the document data stored in the data processing apparatus 100. Hereinafter, backing-up of all the document data is referred to as "all backing-up". When wishing all backing-up, the user checks the check box 1201.

An input area 1202 is for instructing, when all backing-up is executed every day, at what time all backing-up is executed every day.

An input area 1203 is for instructing, when all backing-up is executed on a designated day of the week, at what time and on what day all backing-up is executed. The user inputs time to execute all backing-up in a section of a day of the week to execute all backing-up.

A check box 1204 is for instructing whether to back up only a difference from a last time. Hereinafter, backing-up of only the difference from the last time is referred to as "difference backing-up". When wishing to back up the difference, the user checks the check box 1204.

An input area 1205 is for instructing, when difference backing-up is executed every day, at what time difference backing-up is executed every day. The user inputs time to execute difference backing-up.

An input area 1206 is for instructing, when difference backing-up is executed on a designated day of the week, at what time and on what day difference backing-up is executed. The user inputs time to execute difference backing-up in a section of a day of the week to execute difference backing-up.

When the user presses an OK button 1207 on a setting screen displayed in the external apparatus, data set on the setting screen (referred to as schedule setting data) is transmitted from the external apparatus to the data processing apparatus 100 to be stored in the RAM 103.

When the user presses an OK button 1207 on a setting screen displayed in the operation unit 107, data set on the setting screen (referred to as schedule setting data) is stored in the RAM 103.

Figure 13:
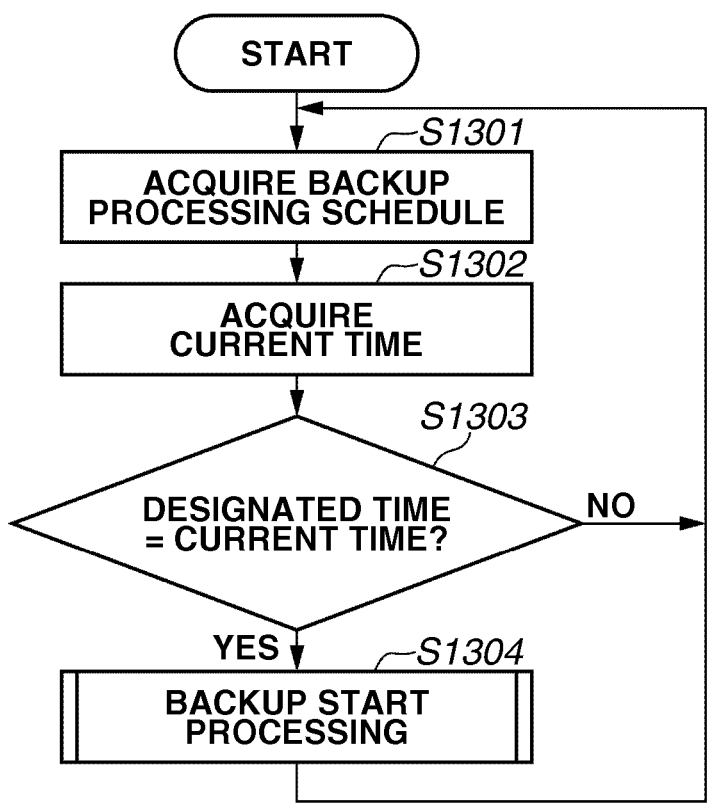
FIG. 13 is a flowchart illustrating scheduling of back-up processing.

FIG. 13 is a flowchart illustrating scheduling processing of backing-up. The CPU 102 realizes the scheduling processing by executing a program.

In step S1301, the application unit 200 acquires the schedule setting date from the RAM 103. In step S1302, the application unit 200 acquires current time from a clock.

The clock can be included in the data processing apparatus 100 or connected to the LAN 111. When the clock is connected to the LAN 111, the data processing apparatus 100 acquires current time from the clock via the LAN 111.

In step S1303, the application unit 200 compares the schedule setting data acquired in step S1301 with the current time acquired in step S1302 to determine whether time designated to execute all backing-up or difference backing-up matches the current time. When they are not matched (NO in step S1303), the processing returns to step S1301.

When the designated time matches the current time (YES in step S1303), in step S1304, the application unit 200 executes backup start processing.

Next, unmounting of the USB storage device is described. The unmounting is executed according to an instruction input via the operation unit 107.

FIG. 14 illustrates an example of an operation screen for executing unmounting. An operation screen 1401 displays a list of USB storage devices connected to the data processing apparatus 100 and mounted. The list may include USB storage devices other than backup USB storage devices.

When the user selects a USB storage device to be unmounted, and presses a "remove" button on the operation screen 1401, unmounting processing of the selected USB storage device is executed. An operation screen 1402 is displayed when the unmounting is successful. On the operation screen 1402, the USB storage device instructed to be unmounted has been deleted from the list.

Figure 15:
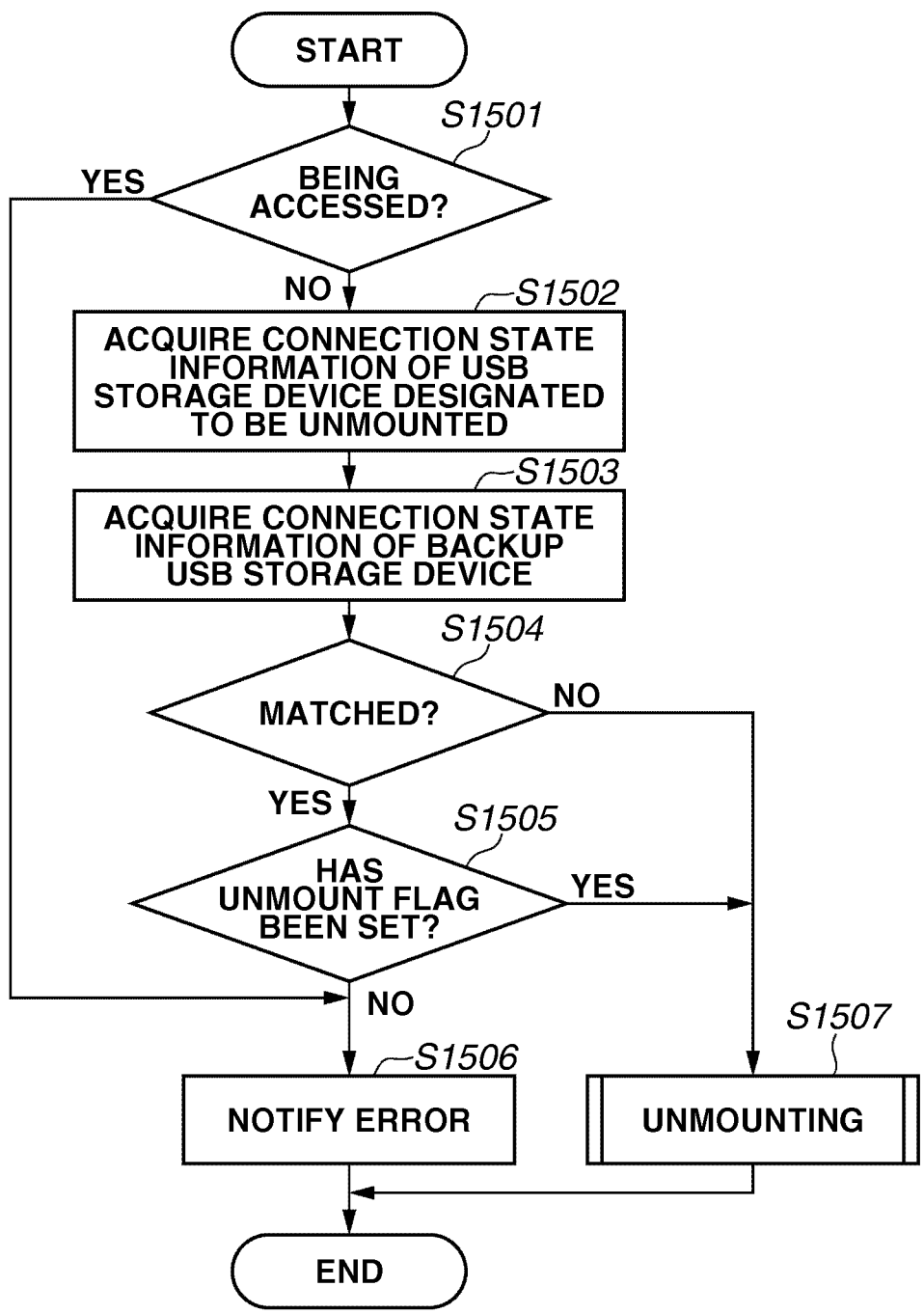
FIG. 15 is a flowchart illustrating unmounting processing of the USB storage device.

FIG. 15 is a flowchart illustrating unmounting processing of the USB storage device. The CPU 102 realizes the unmounting processing by executing a program.

In step S1501, when the USB storage detection unit 204 is instructed to execute unmounting, the USB storage detection unit 204 determines whether a USB storage device instructed to be unmounted is being accessed. When the device is being accessed (YES in step S1501), in step S1506, the application unit 200 notifies an unmounting failure via the operation unit 107.

When the device is not being accessed (NO in step S1501), in step S1502, the application unit 200 acquires connection state information of the USB storage device instructed to be unmounted from the USB storage state management unit 203. In step S1503, the application unit 200 acquires the backup destination identification information stored in the RAM 103.

In step S1504, the application unit 200 compares the connection state information acquired in step S1502 with the backup destination identification information acquired in step S1503 to determine matching thereof.

Non-matching means that the USB storage device instructed to be unmounted is not a backup USB storage device. Thus, when non-matching is determined (NO in step S1504), in step S1507, the application unit 200 unmounts the USB storage device selected by the user. The processing performed in step S1507 is described in detail below.

When matching is determined (YES in step S1504), in step S1505, the application unit 200 determines whether an unmount flag has been set. Setting of the unmount flag means that a remaining amount of capacity of the USB storage device becomes short during data backing-up. Hence, the USB storage device must be replaced.

When it is determined that the unmount flag has been set (YES in step S1505), in step S1507, the application unit 200 unmounts the USB storage device selected by the user.

When the connection state information acquired in step S1502 matches the backup destination identification information acquired in step S1503, and no unmount flag has been set, it means that unmounting of the USB storage device designated as a backup destination has been instructed.

Thus, in step S1506, the application unit 200 notifies an error indicating an unmounting failure via the operation unit 107. It is because when the USB storage device designated as the backup destination is unmounted, backing-up is not appropriately executed.

Figure 16:
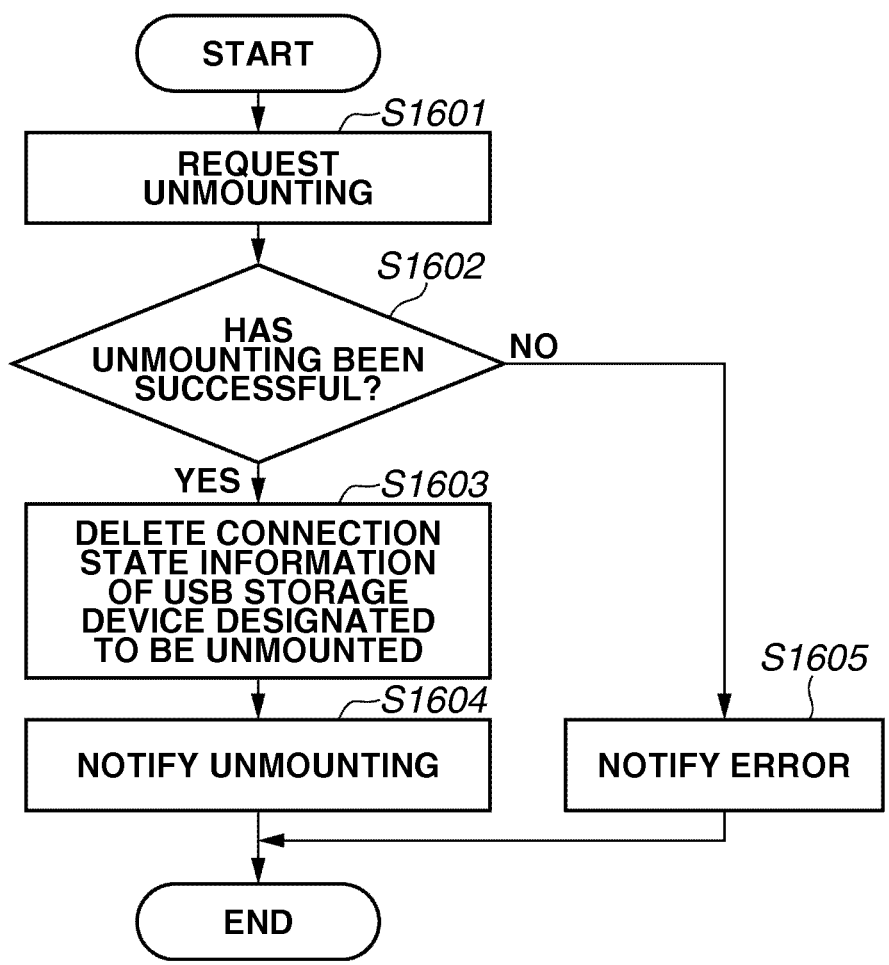
FIG. 16 is a flowchart illustrating unmounting processing.

FIG. 16 is a flowchart illustrating the unmounting processing performed in step S1507. The CPU 102 realizes the unmounting by executing a program.

In step S1601, the USB storage detection unit 204 instructs the operating system 201 to unmount the USB storage device selected by the user. The operating system 201, which has received the unmounting instruction, separates a device file allocated to the USB storage device from the mounting point of the file system.

The file system of the USB storage device expanded in the layers below the mounting point is removed, and hence access to a file stored in the USB storage device is not possible.

This unmounting processing enables physical separation of the USB storage device from the data processing apparatus 100 without damaging data stored in the USB storage device.

In step S1602, the USB storage detection unit 204 determines whether the unmounting has been executed successfully. When it has been executed successfully (YES in step S1602), in step S1603, the unmounted USB storage state management unit 203 deletes the connection state information of the USB storage device from the table.

The USB storage state notification unit 202 notifies the application unit 200 of the unmounting of the USB storage device selected by the user.

In step S1604, the application unit 200 notifies the unmounting of the USB storage device via the operation unit 107. For example, the operation screen 1402 illustrated in FIG. 14 is displayed on the operation unit 107.

When the USB storage detection unit 204 determines that the unmounting has not been executed successfully (NO in step S1602), the USB storage state notification unit 202 notifies the application unit 200 of an unmounting failure. In step S1605, the application unit 200 notifies an error indicating the unmounting failure via the operation unit 107.

FIG. 17 illustrates an example of a backup setting screen displayed when backup setting is canceled. The user cancels the backup setting by setting a storage destination of the backup data to "do not set".

Figure 18:
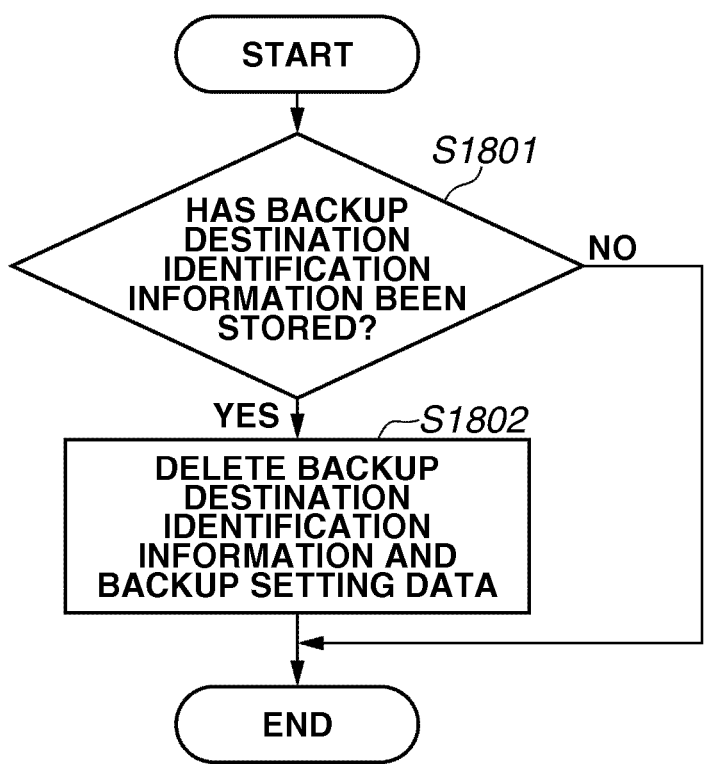
FIG. 18 is a flowchart illustrating cancel processing for cancelling the backup setting.

FIG. 18 is a flowchart illustrating cancellation processing of backup setting. The CPU 102 realizes the cancellation processing by executing a program.

In step S1801, when the OK button is pressed in the state illustrated in FIG. 17, the application unit 200 determines whether backup destination identification information is stored in the RAM 103. When it is stored (YES in step S1801), in step S1802, the application unit 200 deletes the backup destination identification information and the backup setting data from the RAM 103.

According to the above described exemplary embodiment, when the UBS storage device set as the backup destination is instructed to be unmounted, even during access to the USB storage device, unmounting of the USB storage device can be prevented. This can prevent backup failures.

According to the above described exemplary embodiment, the USB storage device is set as the backup destination. However, other types of external memory units can be used.

According to the above described embodiment, the backup destination identification information, the backup setting data, and the schedule setting data are stored in the RAM 103. However, such data can be stored in the HDD 105.

According to the present invention, when the external memory unit is a data backup destination, an accessible state to the external memory unit is prevented from being canceled.

According to the present invention, when the external memory unit is the data backup destination, even if the external memory unit is removed, the external memory unit can be recognized as the data backup destination.

Therefore, the present invention can reduce data backup failures.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-260527 filed Nov. 22, 2010, which is hereby incorporated by reference herein in its entirety.

What is claimed is:

1. A data processing apparatus configured to back up data in an external memory unit, comprising:
    an access control unit configured to set an accessible state of the external memory unit;
    a setting unit configured to set the external memory unit as a backup destination; and
    a backup unit configured to backup data in the external memory unit set in the accessible state and as the backup destination,
    wherein the access control unit is configured to not cancel the accessible state of the external memory unit set as the backup destination even when the accessible state of the external memory unit is instructed to be canceled and data is not being stored in the external memory unit.

2. A data processing apparatus configured to back up data in an external memory unit, comprising:
    an access control unit configured to set an accessible state of the external memory unit;
    a setting unit configured to set the external memory unit as a backup destination; and
    a backup unit configured to backup data in the external memory unit set in the accessible state and as the backup destination,
    wherein the access control unit is configured to cancel the accessible state of the external memory unit if the accessible state of the external memory unit is instructed to be canceled, data is not being stored in the external memory unit and the external memory unit is not set as the backup destination, and to not cancel the accessible state of the external memory unit if the accessible state of the external memory unit is instructed to be canceled, data is not being stored in the external memory unit and the external memory unit is set as the backup destination.

3. The data processing apparatus according to claim 2, further comprising a determination unit configured to determine whether an amount of capacity of the external memory unit is equal to or larger than a threshold value,
    wherein the setting unit is configured to set the external memory unit as the backup destination when the capacity of the external memory unit is equal to or larger than the threshold value.

4. The data processing apparatus according to claim 2, further comprising a second setting unit configured to set, when the data is being backed up in the external memory unit set as the backup destination and the amount of capacity of the external memory unit becomes insufficient to store remaining data, a flag to enable cancellation of the accessible state of the external memory unit,
    wherein the access control unit is configured, even when the external memory unit is set as the backup destination, to cancel the accessible state of the external memory unit if the flag has been set.

5. The data processing apparatus according to claim 2, wherein the access control unit is configured to set the accessible state by executing mounting of the external memory unit, and wherein the access control unit is configured to cancel the accessible state by executing unmounting of the external memory unit.

6. The data processing apparatus according to claim 2, wherein the external memory unit is a USB storage device.

7. A data processing apparatus configured to back up data in an external memory unit, comprising:
an access control unit configured to set an accessible state of the external memory unit;
a setting unit configured to set the external memory unit as a backup destination;
a backup unit configured to backup data in the external memory unit set in the accessible state and as the backup destination; and
a notification unit configured to notify removal of the external memory unit set as the backup destination and removal of an external memory unit not set as a backup destination by different methods.

8. An access control method executed by a data processing apparatus that is configured to back up data in an external memory unit, comprising:
setting an accessible state of the external memory unit;
setting the external memory unit as a backup destination;
backing up data in the external memory unit set in the accessible state and as the backup destination; and
wherein when the accessible state of the external memory unit is instructed to be canceled and data is not being stored in the external memory unit, in the setting of the accessible state of the external memory unit, the accessible state of the external memory unit is canceled if the external memory unit is not set as the backup destination,
wherein even when the accessible state of the external memory unit is instructed to be canceled and data is not being stored in the external memory unit, in the setting of the accessible state of the external memory unit, the accessible state of the external memory unit is not canceled if the external memory unit is set as the backup destination.

9. An access control method executed by a data processing apparatus that is configured to back up data in an external memory unit, comprising:
setting an accessible state of the external memory unit;
setting the external memory unit as a backup destination;
backing up data in the external memory unit set in the accessible state and as the backup destination; and
notifying removal of the external memory unit set as the backup destination and removal of an external memory unit not set as a backup destination by different methods.

10. A non-transitory storage medium for storing a program readable by a computer, the program causing the computer to:
set an accessible state of an external memory unit;
set the external memory unit as a backup destination;
back up data in the external memory unit set in the accessible state and as the backup destination;
wherein when the accessible state of the external memory unit is instructed to be canceled and data is not being stored in the external memory unit, in the setting of the accessible state of the external memory unit, the accessible state of the external memory unit is canceled if the external memory unit is not set as the backup destination, and
wherein even when the accessible state of the external memory unit is instructed to be canceled and data is not being stored in the external memory unit, the computer does not cancel the accessible state of the external memory unit if the external memory unit is set as the backup destination.

11. A non-transitory storage medium for storing a program readable by a computer, the program causing the computer to:
set an accessible state of an external memory unit;
set the external memory unit as a backup destination;
back up data in the external memory unit set in the accessible state and as the backup destination; and
notify removal of the external memory unit set as the backup destination and removal of the external memory unit not set as a backup destination by different methods.

* * * * *